United States Patent
Ost et al.

(10) Patent No.: US 7,090,456 B2
(45) Date of Patent: Aug. 15, 2006

(54) APPARATUS FOR LOADING, TRANSPORTING, STACKING AND FEEDING BALES

(76) Inventors: Rick Ost, P.O. Box 783, Glasgow, MT (US) 59230; Duane Sibley, 64 Black Walnut, Nashua, MT (US) 59248

( * ) Notice: Subject to any disclaimer, the term of this patent is extended or adjusted under 35 U.S.C. 154(b) by 76 days.

(21) Appl. No.: 10/790,933

(22) Filed: Mar. 1, 2004

(65) Prior Publication Data

US 2004/0219000 A1    Nov. 4, 2004

Related U.S. Application Data

(60) Provisional application No. 60/451,305, filed on Feb. 28, 2003.

(51) Int. Cl.
*A01D 90/08* (2006.01)
*A01D 87/12* (2006.01)

(52) U.S. Cl. .................. 414/111; 414/132; 414/789.7; 414/467; 414/409; 414/486

(58) Field of Classification Search .................. 119/58; 414/111, 132, 789.7, 467, 24.5, 444, 469, 414/495, 615, 409, 25, 486, 488, 498, 501, 414/812, 798; 56/474, 476, 480
See application file for complete search history.

(56) References Cited

U.S. PATENT DOCUMENTS

| | | | | |
|---|---|---|---|---|
| 319,553 | A * | 6/1885 | Brokaw et al. | 198/313 |
| 3,763,771 | A * | 10/1973 | Gerber | 100/100 |
| 3,771,673 | A * | 11/1973 | Moeller | 414/514 |
| 3,828,956 | A * | 8/1974 | Dubo | 414/477 |
| 4,044,907 | A * | 8/1977 | Craft | 414/24.5 |
| 4,101,081 | A | 7/1978 | Ritter et al. | |
| 4,227,845 | A | 10/1980 | Colby et al. | |
| 4,267,675 | A * | 5/1981 | Cochran | 52/118 |
| 4,268,208 | A * | 5/1981 | Hankins et al. | 414/332 |
| 4,280,777 | A | 7/1981 | Gray | |
| 4,329,101 | A | 5/1982 | Green et al. | |
| 4,426,183 | A | 1/1984 | Butler | |
| 4,534,691 | A * | 8/1985 | Miguel | 414/789.2 |
| 4,573,845 | A | 3/1986 | Carpenter | |
| 4,715,769 | A * | 12/1987 | Kirtley | 414/571 |
| 4,941,796 | A * | 7/1990 | De Filippi | 414/409 |
| 4,952,111 | A | 8/1990 | Callahan | |
| 5,219,261 | A * | 6/1993 | Barry | 414/392 |
| 5,320,472 | A | 6/1994 | Matlack et al. | |
| 5,639,199 | A | 6/1997 | Connell, Jr. | |
| 5,647,716 | A * | 7/1997 | Tilley | 414/111 |
| 5,671,855 | A * | 9/1997 | Norman. et al. | 220/1.5 |
| 5,758,481 | A | 6/1998 | Fry | |
| 5,813,814 | A | 9/1998 | Smart | |
| 5,882,163 | A | 3/1999 | Tilley | |
| 5,975,824 | A | 11/1999 | Hostetler | |
| 6,019,562 | A * | 2/2000 | Cheatham | 414/111 |
| 6,071,058 | A * | 6/2000 | Tetz et al. | 414/409 |
| 6,079,926 | A | 6/2000 | Cox et al. | |
| 6,171,047 | B1 * | 1/2001 | Vandervalk | 414/24.5 |
| 6,247,885 | B1 | 6/2001 | Smart | |
| 6,312,205 | B1 * | 11/2001 | Vandenberg | 414/24.5 |
| 6,328,520 | B1 | 12/2001 | Maclay | |
| 6,364,591 | B1 * | 4/2002 | Stevenson | 414/25 |
| 6,540,464 | B1 * | 4/2003 | Maclay | 414/111 |

* cited by examiner

*Primary Examiner*—Yvonne R. Abbott
(74) *Attorney, Agent, or Firm*—Jean Kyle

(57) ABSTRACT

An apparatus to load, transport, stack, retrieve and feed bales of hay can be run by a single operator. A vehicle frame supports an operator cab forward of a tiltable bed. A track begins near the ground in front of the cab and proceeds back toward to bed to above the cab. Bales are picked up at the front of the cab and transported to above the cab along the track. Loaded bales are then released onto the bed which is inclined to meet the end of the track. Loaded bales are stacked on the ground by tilting the bed to a near vertical position and driving the apparatus away from the stack.

20 Claims, 9 Drawing Sheets

APPARATUS FOR LOADING, TRANSPORTING, STACKING AND FEEDING BALES

CROSS-REFERENCE TO RELATED APPLICATIONS

This application claims priority to U.S. Provisional Patent Application No. 60/451,305, filed Feb. 28, 2003. The disclosure of this application is hereby incorporated by reference in its entirety, including all figures, tables, and drawings.

BACKGROUND OF THE INVENTION

Hay is essential to any ranching operation but it is an expensive commodity. Loading, transporting and stacking hay bales requires expensive machinery and employs valuable man hours. The heavy machinery required to manipulate large square (e.g. four foot by four foot by eight foot) or round bales can damage well-irrigated hay land that is wet and soft. These cumbersome machines often require more than a single operator occupying valuable pairs of hands.

Large round bales are particularly bothersome to handle. Several machines have been developed to manipulate round bales (U.S. Pat. Nos. 4,101,081; 4,329,101; 4,426,183; and 5,639,199). These machines however are large, complicated devices that handle only round bales. Safety is a concern when handling round bales. Round bales can weigh as much as one and one half tons. Since round bales can easily roll from stacks and during transport and it is important that the operator of an apparatus handling these bales is protected when the bales are being manipulated.

Large square bales are likewise a safety concern because of their weight and can be equally as dangerous if mishandled or poorly stacked. Machines for loading (U.S. Pat. Nos. 5,758,481; 5,882,163; and 5,975,824) and stacking (U.S. Pat. Nos. 4,952,111; 6,079,926; and 6,328,520 B1) large square bales have been developed. These machines however are often limited in the types of bales that they can handle. Ranchers often have to be able to handle more than one type of bale. Owning a single versatile machine that handles round and large square bales is most cost effective for the rancher.

In addition to safe and efficient handling of large bales, proper stacking and storage of these bales is also important. It is estimated that there is as much as 40% waste when feeding bales. Mildew and rot can seriously deplete a useable hay cache. Mildew and rot are caused by excessive moisture in the bales. Precipitation falling on stacked bales can add to this moisture. It is recommended that bales be stacked so that water falling on the bales is wicked away from the bale. Exposed cut ends of the hay in a bale wick water deep into the interior of the bale. Therefore, bales are preferably stacked so that the cut ends are on the side of the stacks. The twine on bales stacked this way wicks the water away from the bales. Large round bales are often stacked in a mushroom configuration where lower bales are stacked cut-ends up and are then capped by the top bale positioned cut-ends to the side. The top bale sheds water that falls on the stack. Available stacking devices invert and twist hay bales during handling (U.S. Pat. Nos. 5,320,472; 5,813,814; and 6,347,885 B1) stacking them cut-ends up.

A versatile bale hauling machine should be able to manipulate a variety of bale sizes and types insuring that the bales are stacked to reduce waste. The machine should be able to be run safely by a single worker, to work efficiently and should be affordable. There remains a need for a bale hauling machine that is faster, cheaper, lighter and more adaptable than those machines that are currently available.

All patents, patent applications, provisional patent applications and publications referred to or cited herein, are incorporated by reference in their entirety to the extent they are not inconsistent with the explicit teachings of the specification.

SUMMARY OF THE INVENTION

The invention is a bale handling apparatus that allows a single operator to safely and efficiently load, transport and stack baled materials. The apparatus is light-weight so that it does not damage irrigated fields. The apparatus comprises a vehicle frame supporting an operator cab and a tiltable bed. To load a bale onto the apparatus, bale moving means engage the bale at the front of the operator cab and move the bale along a track to above the cab. The bale is then released by the bale moving means onto the tiltable bed which is inclined to meet the track. Bales slide, by gravity, onto the tiltable bed. A number of bales can be placed on the bed. Bales are then transported to storage. At the storage site, the bed is tilted to a near vertical position allowing the bale nearest the rear of the bed to touch the ground. The apparatus is then driven away from the stack to unload the hay.

In a preferred embodiment, the apparatus of the subject invention further includes a means to disperse a bale for feeding. The dispersing means separates flakes of hay from the bale without requiring a worker to ride on the back of the apparatus.

The apparatus of the subject invention employs a commercially available pick-up truck so it is lighter in weight than hay hauling machines that use heavy utility vehicles. The subject apparatus can be operated by a single operator to load, transport, stack, retrieve and feed baled hay. The single operator is safe during each task sitting in the operator cab beneath the track.

DETAILED DESCRIPTION OF THE INVENTION

The subject invention is an apparatus to load, transport, stack, retrieve and feed bales of hay. The subject apparatus can be operated by a single worker to perform all functions. The worker is not required to leave the operator cab so is safe from errant bales. The apparatus of the subject invention is lighter in weight than available machines so that it does not damage well-irrigated fields. A variety of sizes and shapes of bales can be handled by the subject apparatus but it is particularly useful in processing square bales. The apparatus of the subject invention comprises a vehicle frame supporting an operator cab and tiltable bed. A track begins at the front of the cab and extends over the top of the cab. To load bales onto the apparatus, the bed is inclined to meet the track at the top of the cab. Bale engaging and moving means engage a bale at the front of the cab and move the bale along the track to the top of the cab. The bale is then released and slides, by gravity, toward the base of the bed. Bales can be loaded onto the apparatus until the bed is full. To unload the bales from the apparatus and stack the bales on the ground, the bed is tilted to near vertical until the bale closest to the end of the bed contacts the ground. The vehicle is simply then driven away.

Figure 1:
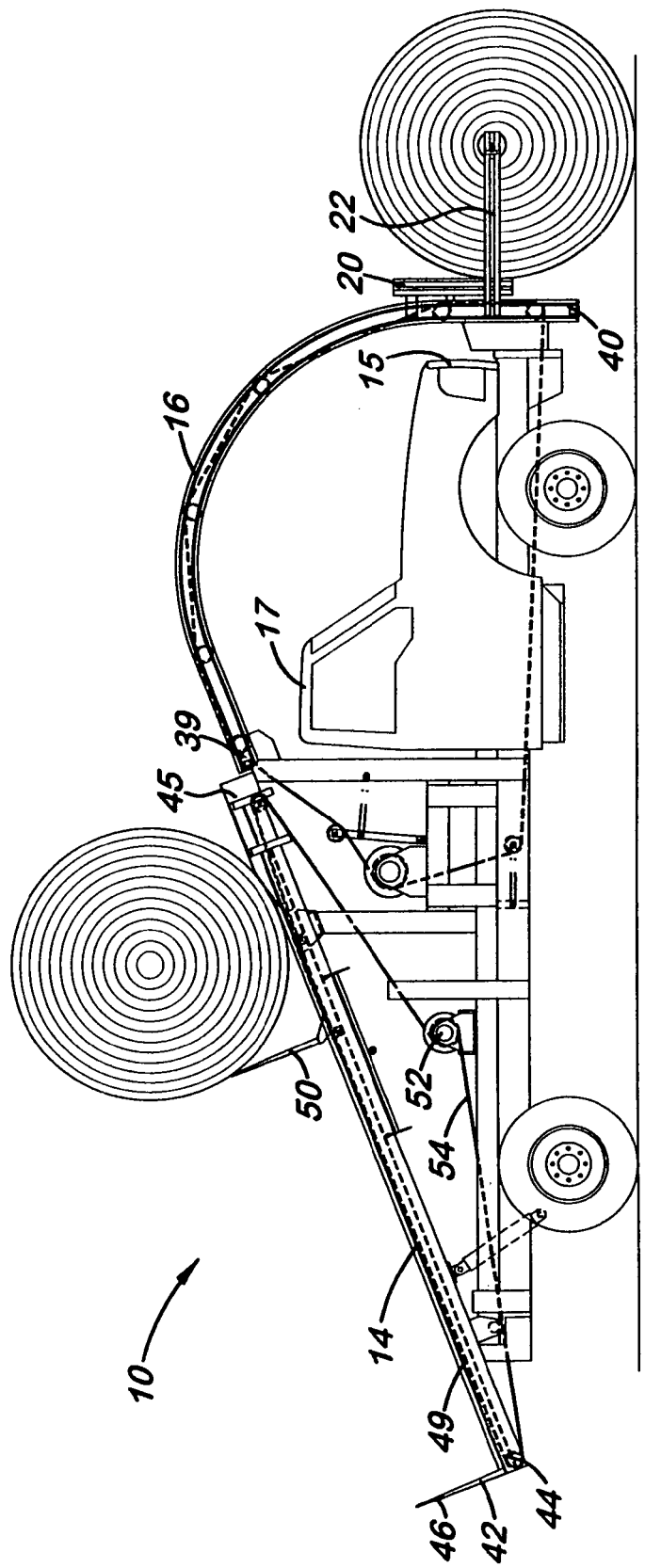
FIG. 1 shows a side elevational view of a preferred embodiment of the bale hauling apparatus of the subject invention loading round bales.

A preferred embodiment of the apparatus of the subject invention is shown generally at 10 in FIG. 1. The apparatus comprises a vehicle frame 11 supporting an operator cab 12 forward of a tiltable bed 14. The vehicle of the subject apparatus preferably is a commercially available pickup truck weighing from about one ton to about two and one-half tons making the apparatus of the subject invention light-weight so that it does not damage wet, soft irrigated land. Furthermore, this light-weight apparatus moves easily through fields, from field to roadway and along improved roads and is legal for highway travel in all states. The vehicle is a conventional self-powered pickup which uses regular or diesel gasoline. There is typically a windshield at the front of the operator cab and a window at rear of the cab.

A track 16 begins near the ground at the front 15 of the operator cab 12 and runs back to above the top 17 of the cab. In a preferred embodiment, the track 16 is constructed of two parallel rail members 18, 18' formed in an arc. In a particularly preferred embodiment, the arc has a radius of about 98 degrees. The track supports a bale as it is moved by the bale engaging and moving means from the ground onto the subject apparatus.

The means to engage and move a bale captures a bale at the front of the vehicle, moves the bale along the track above the top of the operator cab 12 and releases the bale onto the tiltable bed 14. In a preferred embodiment, the bale engaging and moving means comprises a backstop 20 to contact and support the bale. Grasping arms 22, 22' are positioned on either side of the backstop and pivot to capture a bale. The arms are pivoted toward the backstop by hydraulic cylinders 23, 23'.

The hydraulically powered components of the subject invention are supplied by principals known in the art and thus are not shown in detail. A conventional system of hydraulic fluid reservoirs, hydraulic tubes and hoses, and hydraulic pistons and cylinders are used on the subject invention to generate, distribute, transfer, actuate and control the hydraulic components.

Figure 8:
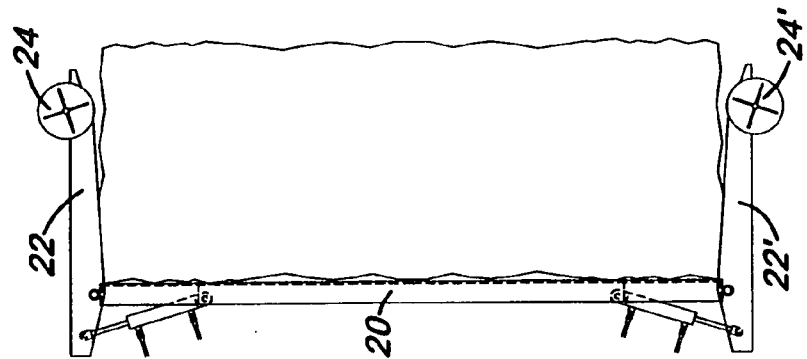
FIG. 8 shows a top plan view of a portion of a preferred embodiment of the bale engaging and moving means of the subject invention engaging a large square bale.
Figure 7:
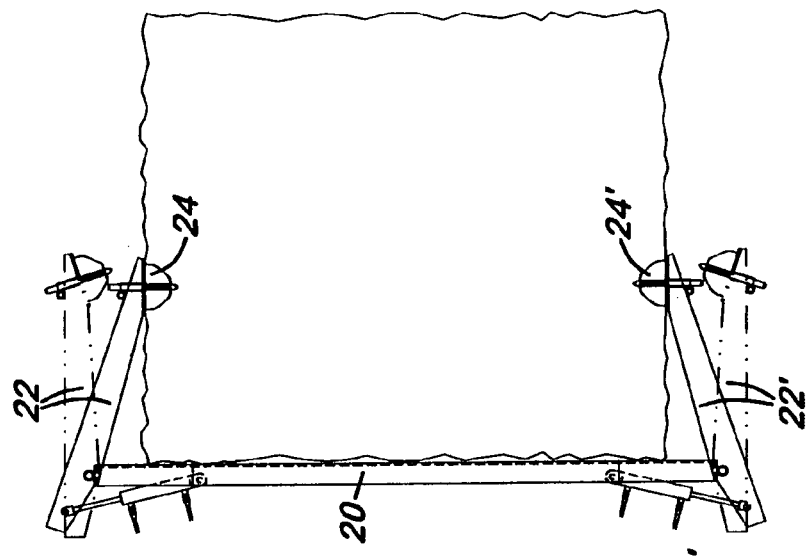
FIG. 7 shows a top plan view of a portion of a preferred embodiment of the bale engaging and moving means of the subject invention engaging a round bale.
Figure 6:
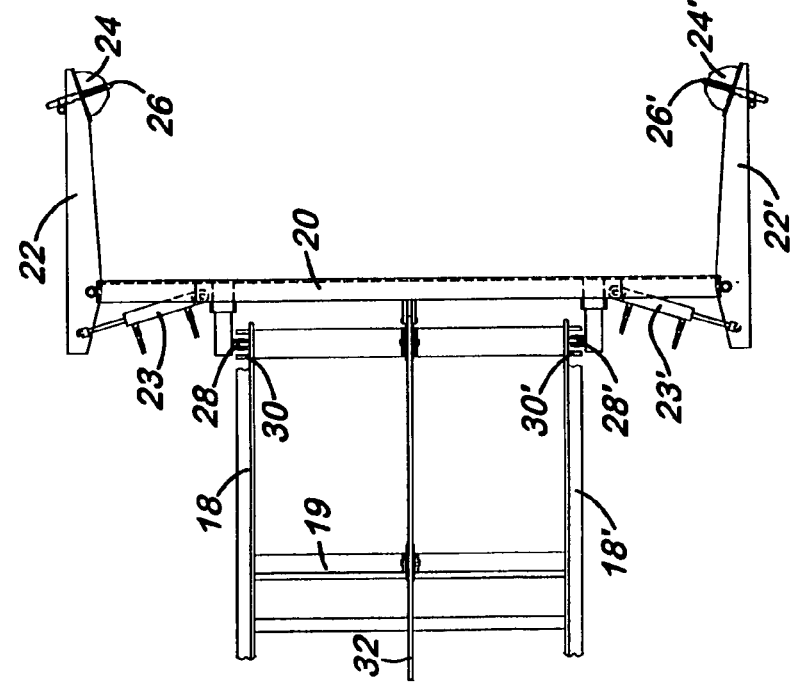
FIG. 6 shows a top plan view of a preferred embodiment of the bale engaging and moving means of the bale hauling apparatus of the subject invention.

The apparatus of the subject invention is advantageous in that it can manipulate a variety of bale types. FIGS. 6–8 show a particularly preferred embodiment of the grasping arms. Large square bales are captured when they are squeezed between the pivoting grasping arms (FIG. 8). Specialized nipples 24, 24' attached to the ends of each arm 22, 22' can be rotated into position to handle round bales. The nipples 24, 24' have pins 26, 26' at their apex to assist in grabbing the round bales (FIG. 6 and FIG. 7).

The bale engaging and moving means captures a bale on the ground then moves the bale along the track until releasing it onto the tiltable bed. In a preferred embodiment, the backstop and bale are moved along the track by a hydraulic winch. The backstop 20 is slidably connected to the track 16. In the exemplified embodiment, the track comprises two parallel rail members 18, 18' which are braced 19 in a spaced apart relationship. The braces serve to stabilize the track and enhance the safety of the apparatus by preventing bales from falling onto the operator cab. The rail members are C-shaped high strength steel bars. Rollers 28, 28' on the backstop 20 engage and slide along channels 30, 30' formed by the C of the rail members (FIG. 6).

The hydraulic winch which moves the backstop and bale along the track is positioned behind the operator cab 12. The winch cable 32 is attached to the top 34 of the backstop 20 and runs along the track 16 over the operator cab 12 to the winch drum 36. The cable 32 winds around the drum 36 and proceeds under the operator cab 12 to attach to the bottom 38 of the backstop 20. Spring loaded cable tighteners 37, 37' attach to the cable on either side of the drum 36 to insure there is enough tension to move the backstop up and down the track in a controlled manner.

Figure 2:
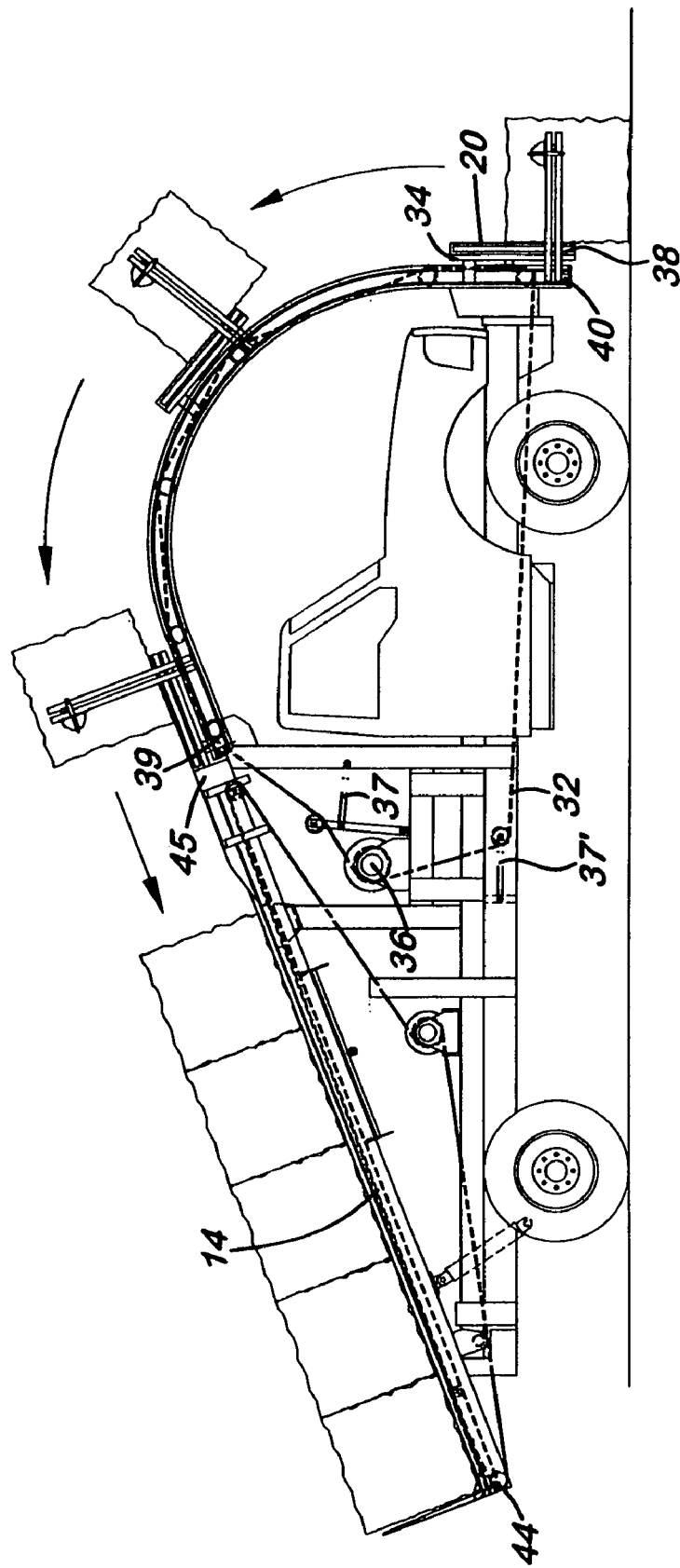
FIG. 2 shows a side elevational view of a preferred embodiment of the bale hauling apparatus of the subject invention loading large square bales.
Figure 3:
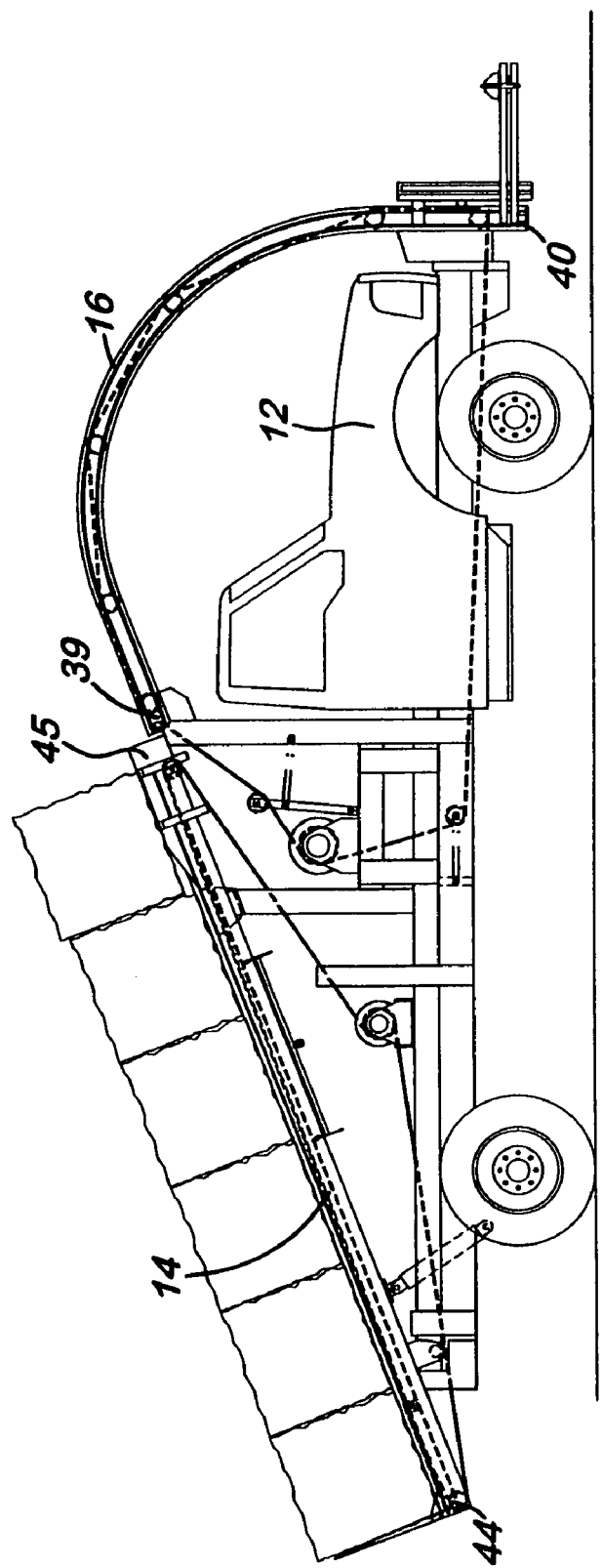
FIG. 3 shows a side elevational view of a preferred embodiment of the bale hauling apparatus of the subject invention transporting large square bales.
Figure 4:
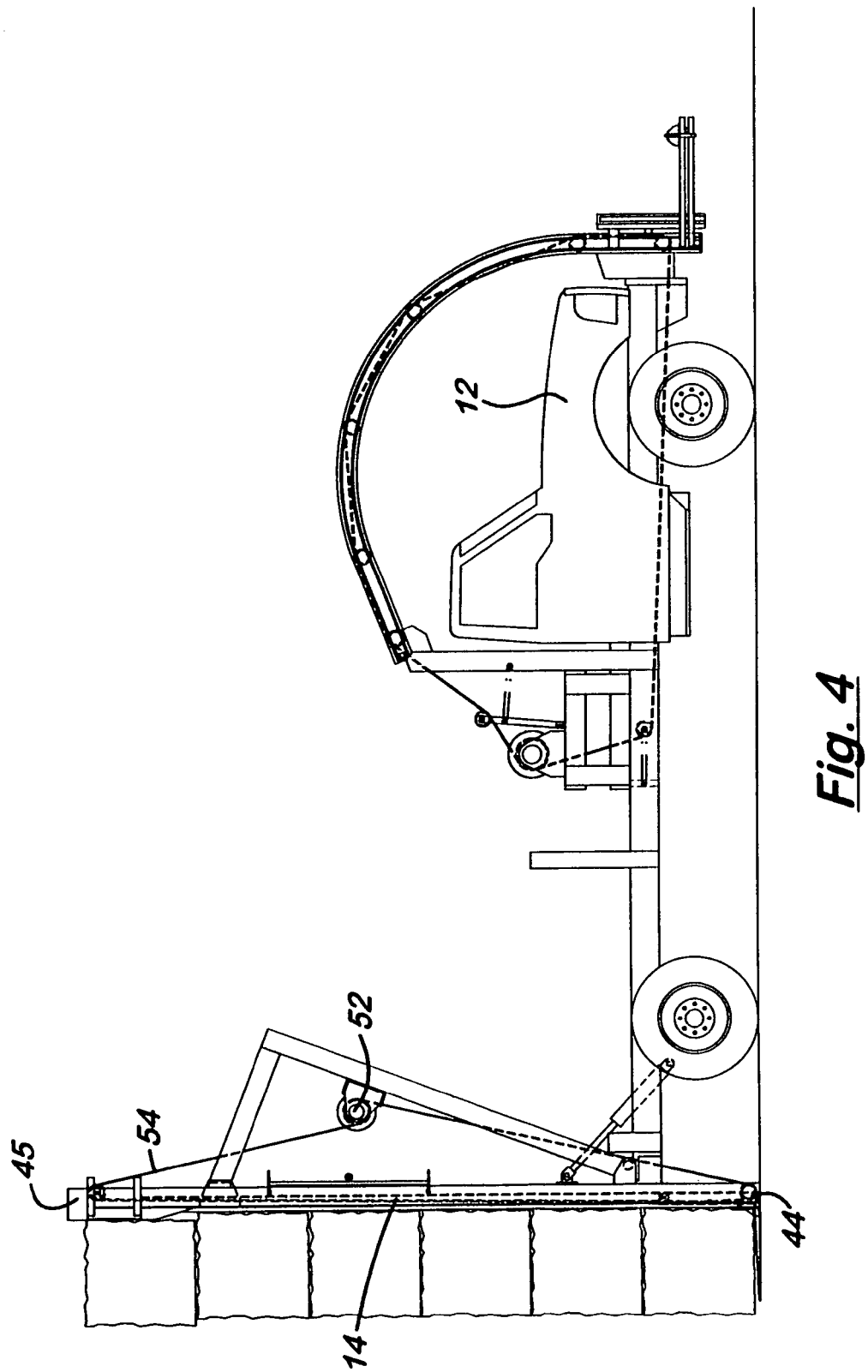
FIG. 4 shows a side elevational view of a preferred embodiment of the bale hauling apparatus of the subject invention stacking large square bales.

When the bale and backstop reach the upper end 39 of the track 16 the grasping arms 22, 22' release the bale and the bale slides onto the tiltable bed 14. The backstop returns to the base 40 of the track 16 near the ground to pick up another bale. The tiltable bed 14 is pivotally attached to the vehicle frame 11 opposite the operator cab 12. The bed can tilt from an inclined position where the front end of the bed 45 meets the upper end 39 of the track 16 (FIGS. 1–3) to a near vertical position (FIG. 4). In a particularly preferred embodiment, the bed tilts about 98 degrees or slightly past vertical to assist in off-loading the hay. The bed can be tilted by a variety of known means, including, but not limited to, a dump truck-like hoist or another combination of hydraulic cylinders. The tiltable bed 14 has a stop 42 at the rear 44 of the bed to hold loaded bales on the inclined bed. The stop can be any configuration so long as it prevents loaded bales from leaving the inclined bed. In a preferred embodiment, the stop 42 is two or more prongs 46, 46' orthogonal to the bed and long enough to support a bale. For example, two prongs on a bale hauling apparatus configured to manipulate round and large square bales are about 32 inches long and are spaced about six feet apart. Other stops useful on the apparatus of the subject invention include, but are not limited to, plates and gates.

Bales released onto the inclined bed slide by gravity toward the rear 44 of the bed. Controlling the bale's movement down the bed enhances the safety of the apparatus. The first several bales loaded can be caught and held intermediate on the bed or can be slowly guided to the rear of the bed by a catch means. In a preferred embodiment, the means to catch a bale as it slides along the inclined bed includes a retrieval plate 48 mounted at about the elevation of the surface 49 of the bed. The plate can be mounted within a channel of the bed or on the surface of the bed. The plate supports two spurs 50, 50' perpendicular to the plate 48 and to the surface of the bed. The spurs are long enough to control the bales being handled and spaced to adequately support them. For example, the spurs for an apparatus hauling round and large square bales are about 32 inches long and are separated by about four feet. A winch 52 controls movement of the spurs and plate supporting the bale. The winch cable 54 is attached to the retrieval plate 50 moving the plate up and down the bed. Although the described means to catch a bale is mechanically controlled, it is important to note that any means to catch a bale as it is descending the inclined bed would enhance the safety of the subject apparatus. Such catch means could be, for example, a gate or plate supported by a tensioned spring or by friction. The exemplified embodiment is particularly advantageous in that it can move bales to the rear 44 of the bed or to the front 45 of the bed toward the feeding means which will be described in detail below.

Figure 12:
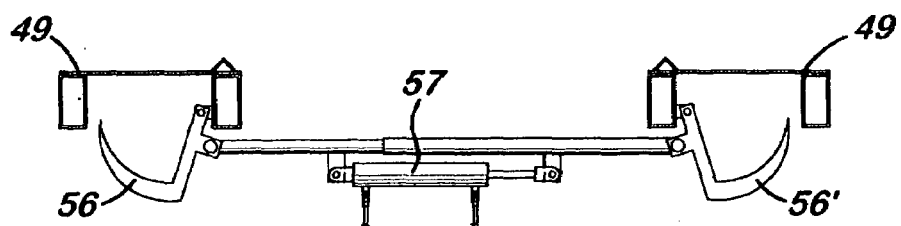
FIG. 12 shows a partial rear elevational view of a preferred embodiment of the bale securing means of the bale hauling apparatus of the subject invention.
Figure 13:
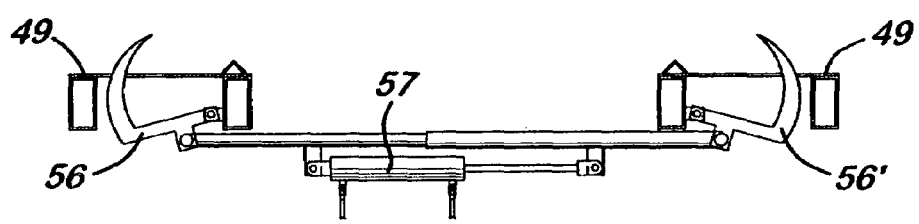
FIG. 13 shows a sectional rear elevational view of the preferred embodiment of the bale securing means shown in FIG. 12 positioned to hold a bale.
Figure 14:
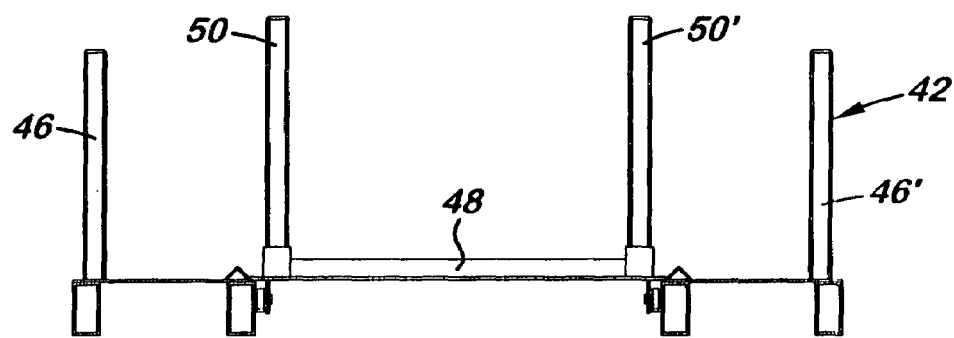
FIG. 14 shows a rear elevational view of a preferred embodiment of a tiltable bed of the vehicle of the bale hauling apparatus of the subject invention.

In a preferred embodiment, the bed has a means to secure the bales to the bed. In a particularly preferred embodiment, the securing means are one or more grapples 56. The grapples lay beneath the surface 49 of the bed (FIG. 12) as the bales are being loaded but are driven above the bed's surface (FIG. 13) to secure loaded bales to the bed during transport. The grapples 56 are controlled by a hydraulic cylinder 57. It is therefore not necessary to tie the bales to the bed of the subject apparatus since the securing means safely holds the bales to the bed during transport.

Figure 5:
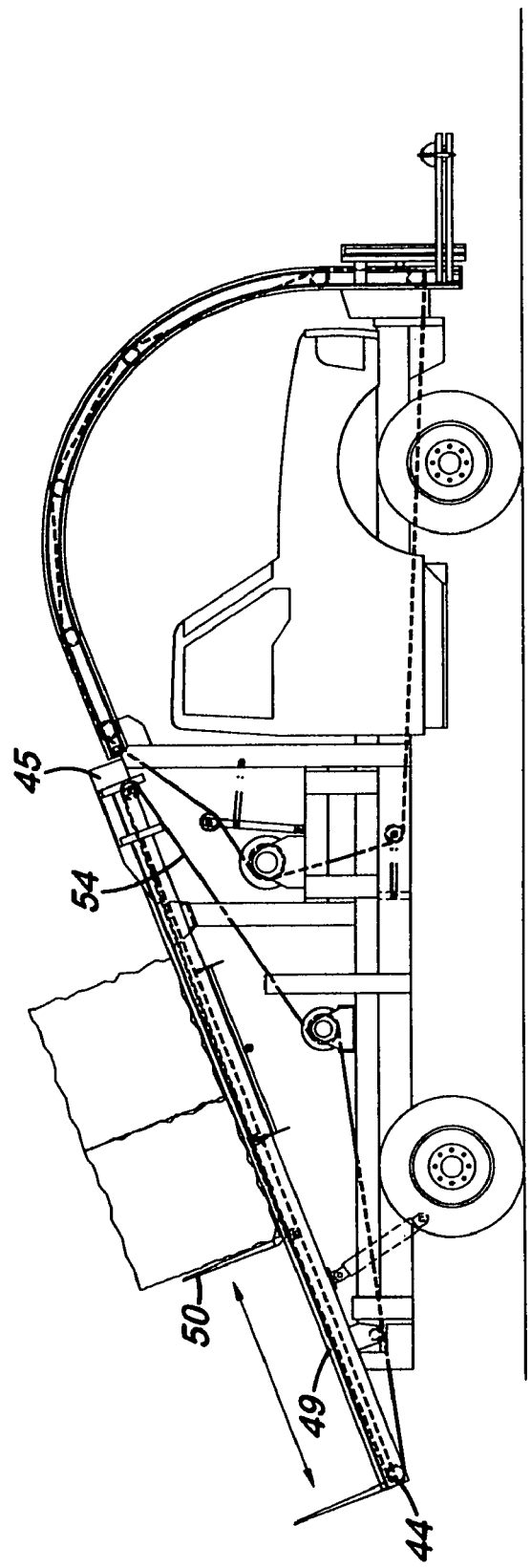
FIG. 5 shows a side elevational view of a preferred embodiment of the bale hauling apparatus of the subject invention partially loaded with large square bales.
Figure 15:
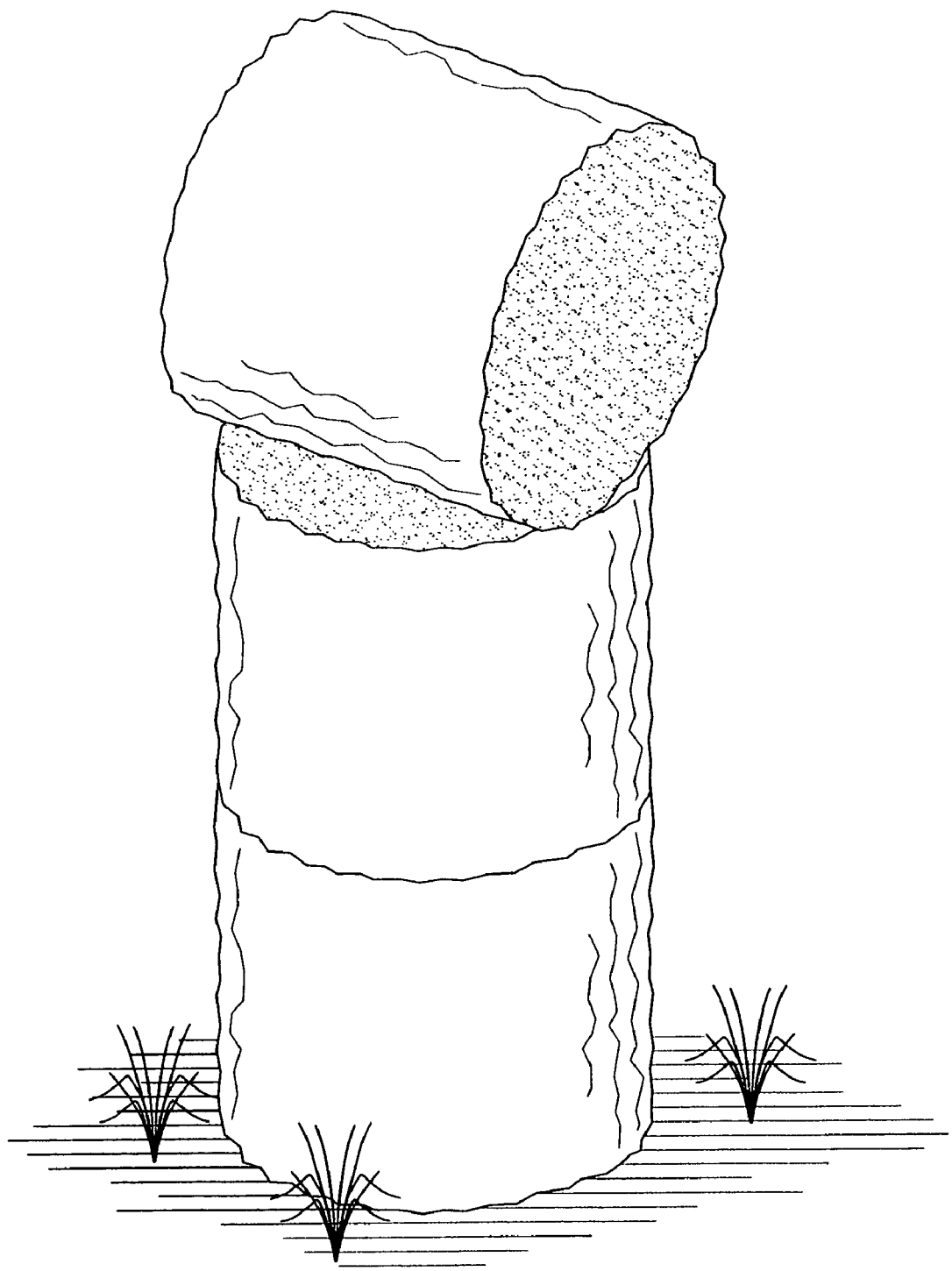
FIG. 15 shows round bales stacked in a mushroom configuration by the apparatus of the subject invention.

The apparatus of the subject invention loaded with bales can transport the bales to a storage facility. At the storage site, bales are off-loaded by releasing the grapples 56 and tilting the bed to near vertical (FIG. 5). When the bale closest to the rear 44 of the bed touches or is near the ground, the apparatus is driven away from the bales which sit stacked on the ground. A particular advantage of the apparatus of the subject invention is that it stacks square bales with the twine or strings up. Bales laying in the field have the cut ends to the sides and strings up. The subject apparatus manipulates the bales so that the bales are stacked with the strings up. Other available hay hauling machines flip the bales during pick-up to stack them cut-ends up. In order to stack the bales properly to reduce rot, operators using the other machines must flip the bales in the field first then load them onto their machines introducing an additional step into the process. Further, the apparatus of the subject invention allows round bales to be stacked in the preferred mushroom configuration. The first two bales are loaded onto the apparatus endwise while the third is loaded onto the apparatus on its side to cap the stack (FIG. 15).

Bales can be retrieved from stacks by the subject apparatus to move them to alternative locations or to feed the bales. To retrieve stacked bales, the bed of the apparatus is positioned at near vertical. The apparatus is then backed toward the stack until the bed meets the bales. The stop 42 slides under the stack. The bed is then tilted to meet the track. Grapples 56 can be used to capture misplaced bales in the stack and further secure the stack to the bed.

Figure 9:
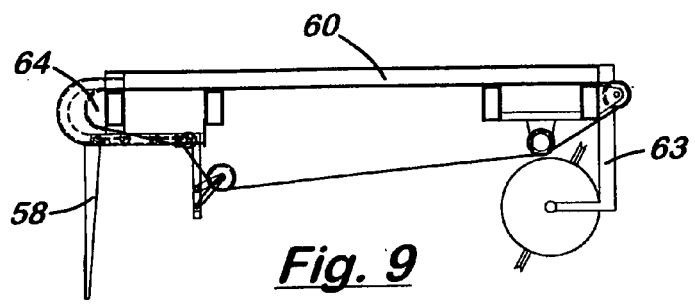
FIG. 9 shows a partial side elevational view of a preferred embodiment of a feeder means of the bale hauling apparatus of the subject invention.
Figure 11:
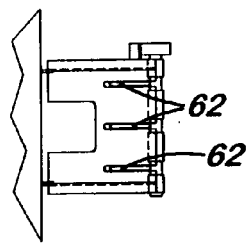
FIG. 11 shows a partial top plan view of a preferred embodiment of the feeder means shown in FIG. 9.
Figure 10:
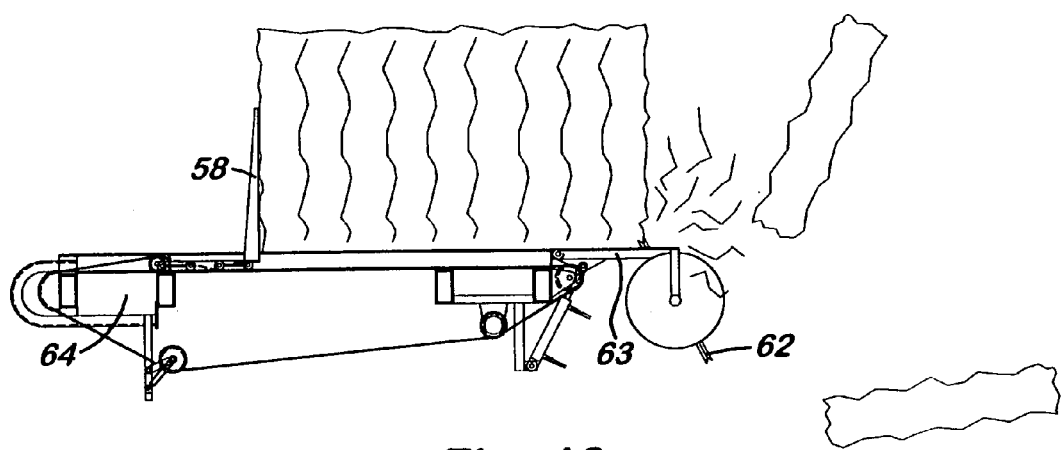
FIG. 10 shows a partial side elevational view of the preferred embodiment of the feeder means shown in FIG. 9 dispersing for feeding a large square bale.

Round bales can be fed by the apparatus of the subject invention by pushing round bales from which the strings have been cut with the backstop 20 of the apparatus to unroll the bale. The bale engaging and moving means can be used to pick up and loosen stubborn bales. Large square bales are fed using a feeding means. A preferred embodiment of a feeding means for inclusion on the apparatus of the subject invention is shown in FIGS. 9–11. The feeding means comprises a push plate 58 near the front 45 of the bed that pushes a bale crosswise along a track 60 from one side of the bed toward the other. At the end of the track 60 opposite the push plate are rotating feeding tines 62 that flake the hay from an open bale dropping the flakes to the ground for feeding. The feeding means of this embodiment is driven by a small winch 64. Feeding tines can vary in number and size. The tines can be incorporated into a plate to help support the bale. The plate 63 and tines can extend a distance off the side of the bed to insure hay is dispersed away from the apparatus. Extended tine plates are particularly useful when feeding over a fence. The push plate 58 and plate 63 and tines 62 can be collapsed when not in use so as not to interfere with loading or transport operations.

The apparatus of the subject invention is light-weight allowing it to navigate difficult terrain, to be driven comfortably down roadways and to prevent it from damaging soft irrigated fields. The subject apparatus is versatile handling a variety of types and sizes of bales. A single operator can efficiently use the subject apparatus to load, transport, stack, retrieve and feed bales of hay. A central operator panel (not shown) within the cab allows the operator to perform all functions within the safety of the operator cab.

It is understood that the foregoing examples are merely illustrative of the present invention. Certain modifications of the articles and/or methods employed may be made and still achieve the objectives of the invention. Such modifications are contemplated as within the scope of the claimed invention.

What is claimed is:

1. An apparatus for loading, transporting and stacking bales of hay comprising:
   a vehicle frame supporting an operator cab forward of an inclined bed which is tiltable to a near vertical position, the operator cab having a front and a top;
   a track extending from the front of the cab to above the top of the cab;
   a two-way winch driven means to engage and move a bale;
   wherein the means to engage and move the bale, engages the bale at the front of the cab and moves the bale along the track to above the top of the cab and releases the bale onto the inclined bed which meets the track above the top of the cab.

2. The apparatus of claim 1, wherein said track is an arc.

3. The apparatus of claim 2, wherein said arch has a radius of about 98 degrees.

4. The apparatus of claim 1, wherein said track comprises at least two braked rail members in a spaced apart relationship.

5. The apparatus of claim 1, wherein said means to engage and move a bale comprises a backstop slidably engaging said track and comprising at least two grasping arms pivotally connected to the backstop on opposing sides of the backstop.

6. The apparatus of claim 5, wherein a winch cable is connected to a top of said backstop and runs along said track over said operator cab to a winch drum; the cable winds around the drum and proceeds under said operator cab to attach to a bottom of said backstop; the cable being tightened by spring-loaded cable tighteners on either side of the drum.

7. The apparatus of claim 1, wherein said tiltable bed further comprises a stop to prevent bales loaded on said inclined bed from leaving said inclined bed.

8. The apparatus of claim 7, wherein said stop is at least two prongs at a rear of said bed and extending orthogonally from a surface of said bed.

9. The apparatus of claim 1, wherein said inclined bed further comprises a means to catch bales being loaded onto said bed.

10. The apparatus of claim 9, wherein said catch means comprises a retrieval plate positioned near a surface of said bed and at least one spur extending perpendicular to the plate to catch and hold bales.

11. The apparatus of claim 9, wherein said catch means controllably moves a bale toward a rear of said bed and toward a front of said bed.

12. The apparatus of claim 1, wherein said apparatus further comprises a means to secure bales to said inclined bed.

13. The apparatus of claim 12, wherein said securing means comprises at least one grapple laying below a surface of said bed that extend through said bed to capture and hold loaded bales to said bed.

14. The apparatus of claim 1, further comprising a feeding means, wherin said feeding means dispenses sections of a bale loaded on said apparatus to the ground.

15. An apparatus for loading, transporting and stacking bales of hay comprising:
    a vehicle frame supporting an operator cab forward of a tiltable bed which is tiltable to a near vertical position, the operator cab having a front and a top;
    a track extending from the front of the cab to above the top of the cab;
    a means to engage and move a bale;
    wherein the means to engage and move the bale, engages the bale at the front of the cab and moves the bale along the track to above the top of the cab and releases the bale onto the bed inclined to meet the track above the top of the cab; and
    a means to catch bales being loaded onto the inclined bed, the catch means controllable moving a bale toward a rear of said bed and toward a front of said bed, the catch means comprising a winch.

16. An apparatus for loading, transporting and stacking bales of hay comprising:
    a vehicle frame supporting an operator cab forward of a tiltable bed which is tiltable to a near vertical position, the operator cab having a front and a top;
    a track extending from the front of the cab to above the top of the cab;
    a means to engage and move a bale;
    wherein the means to engage and move the bale, engages the bale at the front of the cab and moves the bale along the track to above the top of the cab and releases the bale onto the bed inclined to meet the track above the top of the cab; and
    a feeding means to disperse sections of a bale loaded on said apparatus to the ground, the feeding means comprises a track near a front of said tiltable bed, the track running crosswise on said bed, a push plate and feeding tines, wherein said push plate advances said bale along the track toward the feeding tines which disperses said sections of the bale sequentially.

17. The apparatus of claim 16, wherein said feeding means is driven by winch.

18. An apparatus for loading, transporting and stacking bales of hay comprising:
    a vehicle frame supporting an operator cab forward of a tiltable bed, the operator cab having a front and atop, the bed tiltable to a near vertical position and comprising a stop to prevent bales loaded on the bed from leaving the bed, the stop comprising at least two prongs at a rear of the bed and extending orthogonally from a surface of the bed, the bed further comprising a catch means to catch bales being loaded onto the bed, the catch means comprising a retrieval plate positioned near the surface of the bed and at least one spur extending perpendicular to the plate to catch and bold the bales, wherein said catch means can be controllably moved toward the rear of the bed and toward a front of the bed;
    a track extending from the front of the cab to above the top of the cab;
    a means to engage and move a bale comprising a backstop slidably engaging said track and comprising a least two grasping arms pivotally connected to the backstop on opposing sides of the backstop;
    wherein the means to engage and move the bale, engages the bale at the front of the cab and moves the bale along the track to above the top of the cab and releases the bale onto the bed inclined to meet the track above the top of the cab.

19. The apparatus of claim 18, further comprising a feeding means comprising a track near said front of said tiltable bed, the track running crosswise on said bed, a push plate and feeding tines, wherein said push plate advances said bale along the track toward the feeding tines which disperses sections of a bale sequentially to the ground.

20. A method of feeding round bales of hay, the method comprising the steps of:
    moving a round bale on an apparatus for loading, transporting and stacking bales of hay comprising, a vehicle frame supporting an operator cab forward of a tiltable bed, the operator cab having a front and a top, the bed tiltable to a near vertical position and comprising a stop to prevent bales loaded on the bed from leaving the bed, the stop comprising at least two prongs at a rear of the bed and extending orthogonally from a surface of the bed, the bed further comprising a catch means to catch bales being loaded onto the bed, the catch means comprising a retrieval plate positioned near the surface of the bed and at least one spur extending perpendicular to the plate to catch and hold the bales, wherein said catch means can be controllably moved toward the rear of the bed and toward a front of the bed;
    a track extending from the front of the cab to above the top of the cab;
    a means to engage and move a bale comprising a backstop slidably engaging said track and comprising a least two grasping arms pivotally connected to the backstop on opposing sides of the backstop;
    wherein the means to engage and move the bale, engages the bale at the front of the cab and moves the bale along the track to above the top of the cab and releases the bale onto the bed inclined to meet the track above the top of the cab, from the bed toward an upper end of the track using, the catch means;
    grasping the bale at the upper end of the track using the bale engaging and moving means to move the bale to a base of the track near the ground;
    releasing the bale to the ground;
    cutting the strings binding the bale;
    lifting the bale using the bale engaging and moving means to loosen the bale;
    pushing the bale with the bale engaging and moving means to unroll the bale for feeding.

* * * * *